United States Patent
Yang et al.

(10) Patent No.: US 12,155,561 B2
(45) Date of Patent: Nov. 26, 2024

(54) METHOD FOR MANAGING NETWORK CONNECTIONS

(71) Applicant: GT BOOSTER INC., Hsinchu (TW)

(72) Inventors: Shun-Yuan Yang, Hsinchu (TW); Chiao Min Hu, Hsinchu (TW); Wei-Teng Tai, Hsinchu (TW)

(73) Assignee: GT BOOSTER INC., Hsinchu (TW)

( * ) Notice: Subject to any disclaimer, the term of this patent is extended or adjusted under 35 U.S.C. 154(b) by 333 days.

(21) Appl. No.: 17/581,644

(22) Filed: Jan. 21, 2022

(65) Prior Publication Data

US 2023/0022435 A1    Jan. 26, 2023

(30) Foreign Application Priority Data

Jul. 20, 2021    (TW) ................. 110126548

(51) Int. Cl.
*H04L 45/30* (2022.01)
*H04L 43/16* (2022.01)
*H04L 45/02* (2022.01)

(52) U.S. Cl.
CPC .............. *H04L 45/30* (2013.01); *H04L 43/16* (2013.01); *H04L 45/10* (2013.01)

(58) Field of Classification Search
CPC .......... H04L 43/16; H04L 45/10; H04L 45/30
See application file for complete search history.

(56) References Cited

U.S. PATENT DOCUMENTS

| | | | | |
|---|---|---|---|---|
| 6,711,137 | B1* | 3/2004 | Klassen | H04L 41/142 370/252 |
| 2006/0109839 | A1* | 5/2006 | Hino | H04L 63/083 370/352 |
| 2008/0101396 | A1* | 5/2008 | Miyata | H04L 12/66 370/408 |
| 2017/0359268 | A1* | 12/2017 | Chan | H04L 1/08 |
| 2019/0230027 | A1* | 7/2019 | Murgia | H04L 45/121 |

FOREIGN PATENT DOCUMENTS

| | | | |
|---|---|---|---|
| JP | 2011114678 A | * | 6/2011 |
| JP | 2013-168817 A | | 8/2013 |
| JP | 2014-82739 A | | 5/2014 |
| JP | 2014082739 A | * | 5/2014 |

OTHER PUBLICATIONS

Hirano JP2011114678A publication date filed on Jun. 9, 2011; translation (Year: 2011).*
Tojo et al. JP2014082739A publication date filed on May 8, 2014; translation (Year: 2014).*

* cited by examiner

*Primary Examiner* — Wutchung Chu
(74) *Attorney, Agent, or Firm* — HSML P.C.

(57) ABSTRACT

A method for managing network connections includes steps of: in response to receipt of a request for establishing a new network connection, storing in a connection-tracking (Conntrack) table an entry of tracked connection data that is related to the new network connection to be established, and updating a current tracked-connection count by adding one thereto; determining a priority level of the new network connection according to a data packet transmitted through the new network connection; and determining whether to output data packets that are received through the new network connection based at least on the current tracked-connection count and the priority level of the new network connection.

13 Claims, 5 Drawing Sheets

METHOD FOR MANAGING NETWORK CONNECTIONS

CROSS-REFERENCE TO RELATED APPLICATION

This application claims priority of Taiwanese Invention Patent Application No. 110126548, filed on Jul. 20, 2021.

FIELD

The disclosure relates to a method for managing network connections, and more particularly to a method for managing network connections connected through a network device.

BACKGROUND

Conventionally, a network device (e.g., a router) stores a connection-tracking (Conntrack) table that is used to store tracked connection data related to network connections of computing devices (e.g., a personal computer, a server, etc.) connected to a network through the network device. Because of limited memory capacity of the network device, capacity of the Conntrack table is also limited. When the Conntrack table has reached its full capacity, the network device would not remove from the Conntrack table any existing entry of tracked connection data, and would unconditionally determine not to output data packets that are received through a new network connection, hindering communications through the new network connection.

SUMMARY

Therefore, an object of the disclosure is to provide a method for managing network connections connected through a network device that can alleviate at least one of the drawbacks of the prior art.

According to the disclosure, the network device stores a connection-tracking (Conntrack) table where entries of tracked connection data related respectively to the network connections are stored. The method includes steps of:
- in response to receipt of a request for establishing a new network connection, storing in the Conntrack table an entry of tracked connection data that is related to the new network connection to be established, and updating a current tracked-connection count by adding one thereto, the current tracked-connection count representing a number of entries of tracked connection data that are currently stored in the Conntrack table and that are related respectively to existing network connections connected through the network device;
- determining a priority level of the new network connection according to a data packet transmitted through the new network connection; and
- determining whether to output data packets that are received through the new network connection based at least on the current tracked-connection count and the priority level of the new network connection.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
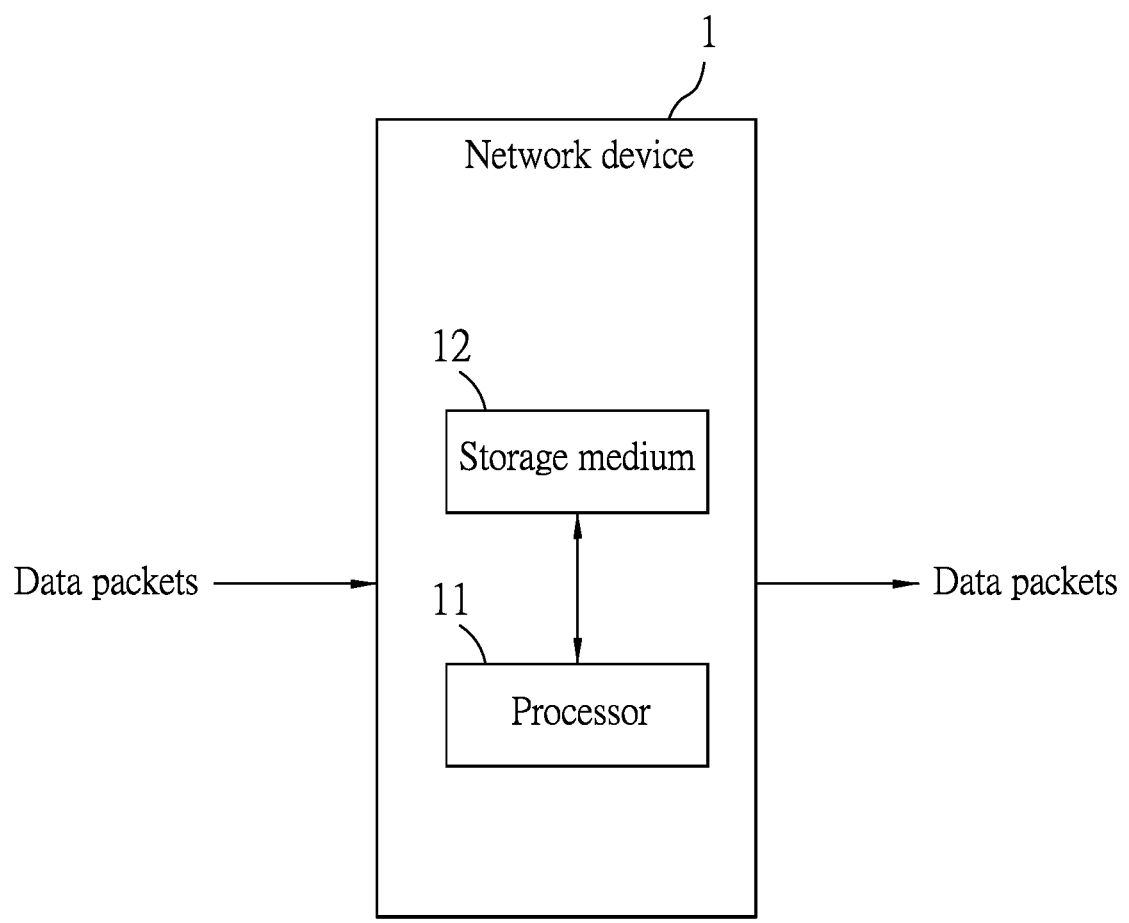
FIG. 1 is a block diagram illustrating an example of a network device that implements a method for managing network connections according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates an embodiment of a network device 1 that is used to implement a method for managing network connections connected through the network device 1 according to the disclosure. Each of the network connections is implemented under Transmission Control Protocol (TCP), but is not limited thereto. In this embodiment, the network device 1 is implemented by a router. However, in other embodiments, the network device may be implemented by a computing device (e.g., a notebook computer or a personal computer) that has network communication capability and that serves as a network terminal. It should be noted that the term "network connection" means a connection of a network equipment (e.g., a personal computer, a server, etc.) to a network (e.g., the Internet) through the network device 1 for data transmission between the network equipment and the network through the network device 1.

The network device 1 includes a processor 11 and a storage medium 12.

The processor 11 may be implemented by a central processing unit (CPU), a microprocessor, a micro control unit (MCU), a system on a chip (SoC), or any circuit configurable/programmable in a software manner and/or hardware manner to implement functionalities discussed in this disclosure.

The processor 11 is configured to execute programs to receive data packets from a network equipment through a network connection and to forward the data packets to corresponding destinations according to Internet Protocol (IP) addresses related to the data packets.

The storage medium 12 may be implemented by random access memory (RAM), double data rate synchronous dynamic random access memory (DDR SDRAM), read only memory (ROM), programmable ROM (PROM), flash memory, a hard disk drive (HDD) or a solid state disk (SSD), electrically-erasable programmable read-only memory (EEPROM) or any other volatile/non-volatile memory devices, but is not limited thereto.

The storage medium 12 is configured to store a connection-tracking (Conntrack) table where entries of tracked connection data related respectively to the network connections are stored. Additionally, the Conntrack table has a table size that is a numerical value (e.g., 16000 or 100000) and that represents a maximum number of data entries which can be stored in the Conntrack table, and a current tracked-connection count that is another numerical value (e.g., 100)

and that represents a number of entries of tracked connection data currently stored in the Conntrack table and related respectively to existing network connections connected through the network device 1. The table size is positively correlated to storage capacity of the storage device 12. Moreover, for each network connection, the respective entry of tracked connection data has a state parameter that represents a current state of the network connection (e.g., "established", "waiting", "operating" or "suspended"). The state "established" means that the network connection has been established, the state "waiting" means that the data packets to be transmitted through the network connection is waiting to be transmitted, the state "operating" means that the network connection is currently used for transmitting data, and the state "suspended" means that the network connection is suspended.

It should be noted that data packet(s) received by the network device 1 will be stored, before being processed, in a buffer which may be implemented by the storage medium 12 of the network device 1. In response to receipt of a request for establishing a new network connection, the processor 11 is configured to store in the Conntrack table an entry of tracked connection data that is related to the new network connection to be established and that has the state parameter thereof indicating the new network connection being in the state "established", and to update the current tracked-connection count by adding one thereto. Subsequently, the processor is configured to determine a priority level of the new network connection according to at least one data packet (e.g., a second one of data packets stored in the buffer of the network device 1) transmitted through the new network connection, and to determine whether to output data packets that are received through the new network connection based at least on the current tracked-connection count and the priority level of the new network connection. In some embodiments, the processor 11 is configured to determine whether to output data packets that are received through the new network connection further based on a predetermined count threshold that is smaller than the table size (i.e., the maximum number of data entries which can be stored in the Conntrack table). For example, the predetermined count threshold may be eighty percent or nighty percent of the table size, but is not limited thereto.

In particular, the processor 11 is configured to determine the priority level of a network connection based on a type of one of two terminals of the network connection, as indicated by said at least one data packet transmitted through the network connection. The priority level of the network connection through which a data packet is received from or sent to any specific type of terminal is assigned in advance. For example, the priority level of a network connection through which a data packet is to be sent to a game server or to a server serving as an online meeting platform is assigned to be a highest priority level; the priority level of a network connection through which a data packet is to be sent to a file server that supports file sharing (e.g., file downloading) is assigned to be a lowest priority level; the priority level of a network connection through which a data packet is to be sent to a multimedia server providing multimedia services is assigned to be a priority level between the highest priority level and the lowest priority level.

It is worth to note that in some cases, whenever the Conntrack table is full, i.e., the current tracked-connection count has reached the table size, the processor 11 would decline the request for establishing a new network connection, and the new network connection will not be established. In other words, the processor 11 would not store in the Conntrack table an entry of tracked connection data related to the new network connection to be established, and would not update the current tracked-connection count.

Specifically, referring to FIGS. 2 to 5, four embodiments of the method for managing network connections are respectively illustrated.

Figure 2:
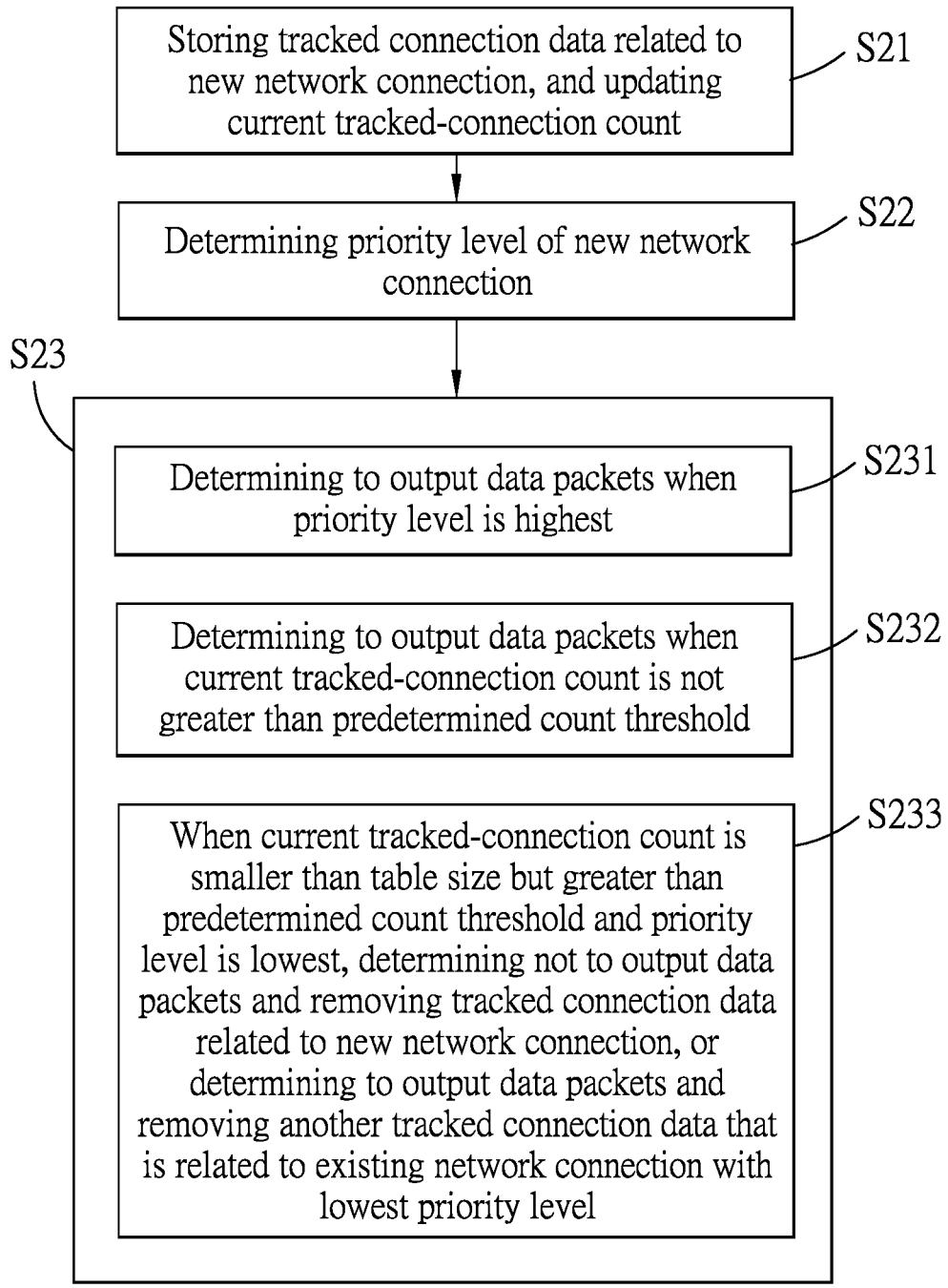
FIG. 2 is a flow chart illustrating a first embodiment of the method according to the disclosure.

Referring to FIG. 2, a first embodiment of the method is illustrated. The method of this embodiment includes steps S21 to S23 delineated below.

In step S21, in response to receipt of a request for establishing a new network connection, the processor 11 stores in the Conntrack table an entry of tracked connection data that is related to the new network connection to be established and that has the state parameter thereof indicating the new network connection being in the state "established", and updates the current tracked-connection count by adding one thereto. It is noted that when the Conntrack table is full, step S21 (and the method entirely) cannot be executed.

In step S22, the processor 11 determines a priority level of the new network connection according to at least one data packet transmitted through the new network connection. In this embodiment, the processor 11 is configured to determine whether the priority level of the new network connection is a highest priority level or a lowest priority level.

In step S23, the processor 11 determines whether to output data packets that are received through the new network connection based at least on the current tracked-connection count, the predetermined count threshold and/or the priority level of the new network connection.

More specifically, step S23 includes sub-steps S231 to S233 delineated below.

In sub-step S231, the processor 11 determines to output the data packets when it is determined that the priority level of the new network connection is not lower than a predetermined level, which is the highest priority level in this embodiment. That is to say, as long as the Conntrack table is not full, data packets received through a new network connection with the highest priority level would be outputted to their destination according to IP addresses indicated in the data packets.

In sub-step S232, the processor 11 determines to output the data packets when it is determined that the current tracked-connection count is not greater than the predetermined count threshold. That is to say, even if the new network connection has the lowest priority level, data packets received through the new network connection would still be outputted to their destination according to IP addresses indicated in the data packets, as long as the current tracked-connection count is not greater than the predetermined count threshold.

In sub-step S233, when it is determined by the processor 11 that a connection condition that the current tracked-connection count is smaller than the table size but is greater than the predetermined count threshold and that the priority level of the new network connection is the lowest priority level is satisfied, the processor 11 determines not to output the data packets and removes from the Conntrack table the entry of tracked connection data related to the new network connection. In an alternative embodiment, under the connection condition previously mentioned, the processor 11 may determine to output the data packets and remove from the Conntrack table one of the entries of tracked connection data that is related to one of the existing network connections which has the lowest priority level.

It is worth to note that removing an entry of tracked connection data from the Conntrack table allows the Conntrack table to store more entries of tracked connection data related to new network connections which may have the highest priority level.

Figure 3:
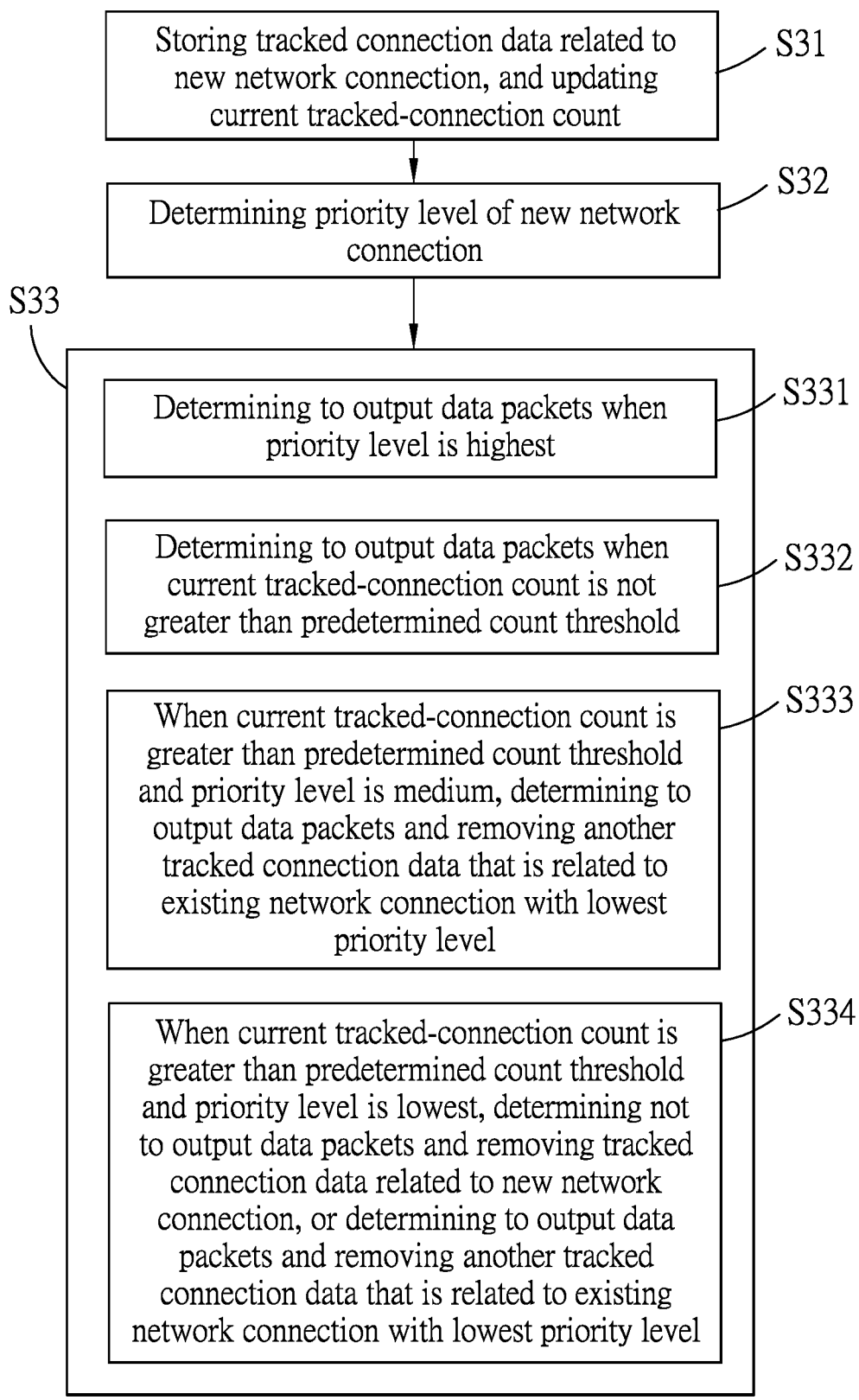
FIG. 3 is a flow chart illustrating a second embodiment of the method according to the disclosure.

Referring to FIG. 3, a second embodiment of the method is illustrated. The method of this embodiment includes steps S31 to S33. Since step S31 in the second embodiment is similar to step S21 of the first embodiment, details of step S31 are omitted herein, and only differences between the first and second embodiments are explained in the following paragraphs for the sake of brevity.

In step S32, the processor 11 determines whether the priority level of the new network connection is the highest priority level, the lowest priority level, Or a medium priority level between the highest priority level and the lowest priority level.

In step S33, the processor 11 determines whether to output data packets that are received through the new network connection based at least on the current tracked-connection count, the predetermined count threshold and/or the priority level of the new network connection.

More specifically, step S33 includes sub-steps S331 to S334 delineated below.

In sub-step S331, the processor 11 determines to output the data packets received from the new network connection when it is determined that the priority level of the new network connection is the highest priority level.

In sub-step S332, the processor 11 determines to output the data packets when it is determined that the current tracked-connection count is not greater than the predetermined count threshold. In other words, data packets received through a new network connection with the lowest priority level or the medium priority level will be outputted when the current tracked-connection count is not greater than the predetermined count threshold.

When it is determined that a connection condition that the current tracked-connection count is smaller than the table size and that the priority level is lower than the highest priority level is satisfied, a procedure flow of the method proceeds to one of sub-steps S333 and S334.

In sub-step S333, under the connection condition, when it is determined that the priority level of the new network connection is the medium priority level and the current tracked-connection count is greater than the predetermined count threshold, the processor 11 determines to output the data packets and removes from the Conntrack table one of the entries of tracked connection data that is related to one of the existing network connections which has the lowest priority level.

In sub-step S334, under the connection condition, when it is determined that the priority level of the new network connection is the lowest priority level and the current tracked-connection count is greater than the predetermined count threshold, the processor 11 determines not to output the data packets and removes from the Conntrack table the entry of tracked connection data related to the new network connection. In an alternative embodiment, under the connection condition, when it is determined that the priority level of the new network connection is the lowest priority level and the current tracked-connection count is greater than the predetermined count threshold, the processor 11 determines to output the data Packets and removes from the Conntrack table one of the entries of tracked connection data that is related to one of the existing network connections which has the lowest priority level.

Figure 4:
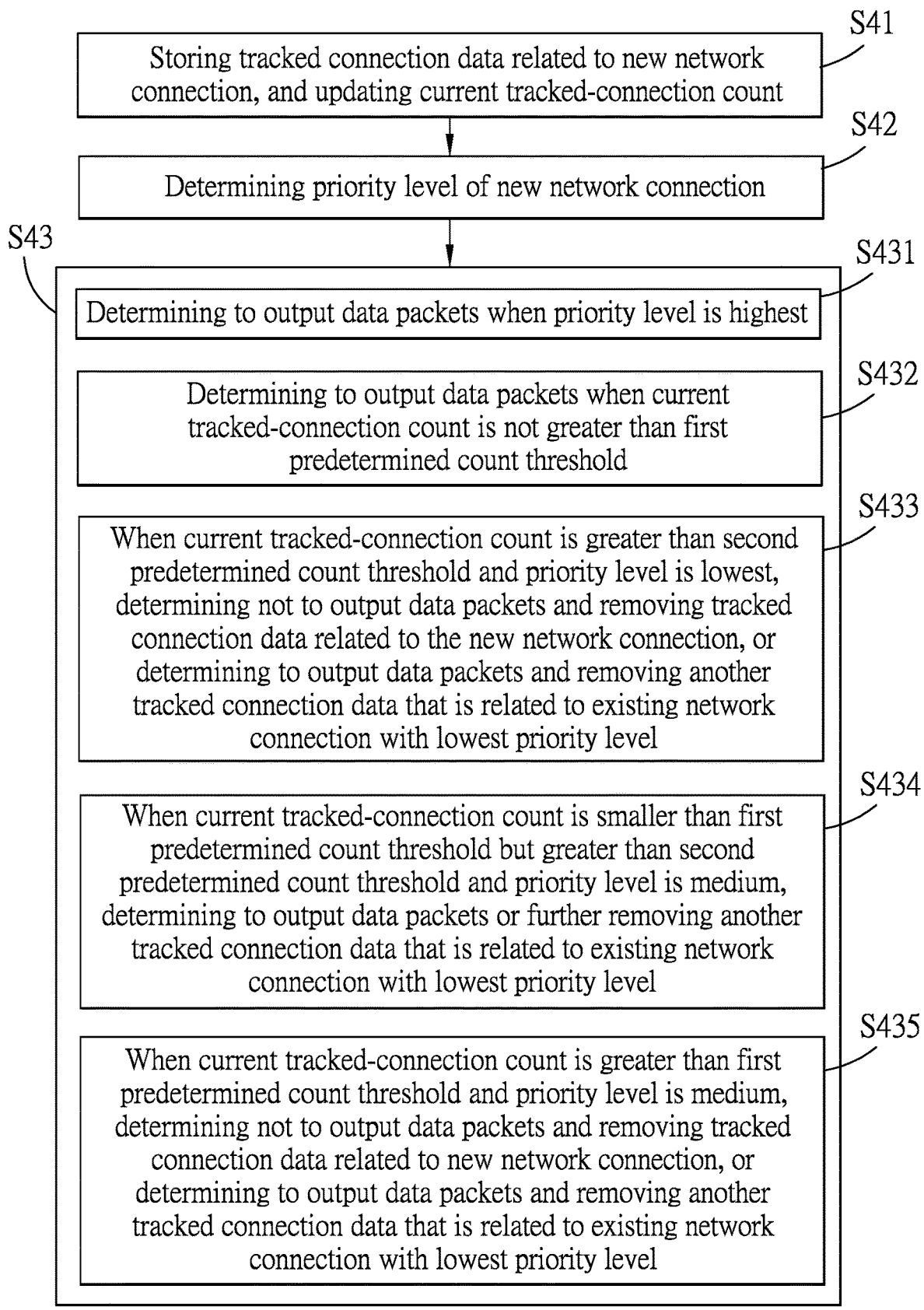
FIG. 4 is a flow chart illustrating a third embodiment of the method according to the disclosure.

Referring to FIG. 4, a third embodiment of the method is illustrated. The method includes steps S41 to S43. Since step S41 in the third embodiment is similar to step S21 of the first embodiment, details of step S41 are omitted herein, and only differences between the first and third embodiments are explained in the following paragraphs for the sake of brevity.

In step S42, the processor 11 determines whether the priority level of the new network connection is the highest priority level, the lowest priority level, or the medium priority level.

In step S43, the processor 11 determines whether to output data packets that are received through the new network connection based on the current tracked-connection count, the priority level of the new network connection, a first predetermined count threshold which is smaller than the table size, and/or a second predetermined count threshold which is smaller than the first predetermined count threshold. The first predetermined count threshold may be eighty percent or nighty percent of the table size, and the second predetermined count threshold may be fifty percent of the table size, but implementations of the first and second predetermined thresholds are not limited to the disclosure herein and may vary in other embodiments.

More specifically, step S43 includes sub-steps S431 to S435 delineated below.

In sub-step S431, the processor 11 determines to output the data packets received from the new network connection when it is determined that the priority level of the new network connection is the highest priority level.

In sub-step S432, the processor 11 determines to output the data packets when it is determined that the priority level of the new network connection is the lowest priority level or the medium priority level and that the current tracked-connection count is not greater than the second predetermined count threshold. As a result, data packets received through a new network connection with the lowest priority level or the medium priority level will be outputted to their destination according to IP addresses indicated in the data packets when the current tracked-connection count is not greater than the second predetermined count threshold.

When a connection condition that the current tracked-connection count is smaller than the table size and greater than the second predetermined count threshold and that the priority level of the new network connection is lower than the highest priority level is satisfied, the procedure flow proceeds to one of sub-steps S433 to S435.

In sub-step S433, under the connection condition mentioned above, when it is determined that the priority level of the new network connection is the lowest priority level, the processor 11 determines not to output the data packets and removes from the Conntrack table the entry of tracked connection data related to the new network connection. Alternatively, under the same connection condition, when it is determined that the priority level of the new network connection is the lowest priority level, the processor 11 determines to output the data packets and removes from the Conntrack table one of the entries of tracked connection data that is related to one of the existing network connections which has the lowest priority level.

In sub-step S434, under said connection condition, when it is determined that the priority level of the new network connection is the medium priority level and the current tracked-connection count is smaller than the first predetermined count threshold, the processor 11 determines to output the data packets and removes from the Conntrack table one of the entries of tracked connection data that is related to one of the existing network connections which has the lowest priority level. In an alternative implementation, under said connection condition, when it is determined that the priority level of the new network connection is the medium priority level and the current tracked-connection count is smaller than the first predetermined count threshold, the processor 11 determines to output the data packets without removing from the Conntrack table one of the entries of tracked connection data that is related to one of the existing network connections which has the lowest priority level.

In sub-step S435, under said connection condition, when it is determined that the priority level of the new network connection is the medium priority level and the current tracked-connection count is greater than the first predetermined count threshold, the processor 11 determines not to output the data packets and removes from the Conntrack table the entry of tracked connection data related to the new network connection. Alternatively, under said connection condition, when it is determined that the priority level of the new network connection is the medium priority level and the current tracked-connection count is greater than the first predetermined count threshold, the processor 11 determines to output the data packets and removes from the Conntrack table one of the entries of tracked connection data that is related to one of the existing network connections which has the lowest priority level.

Figure 5:
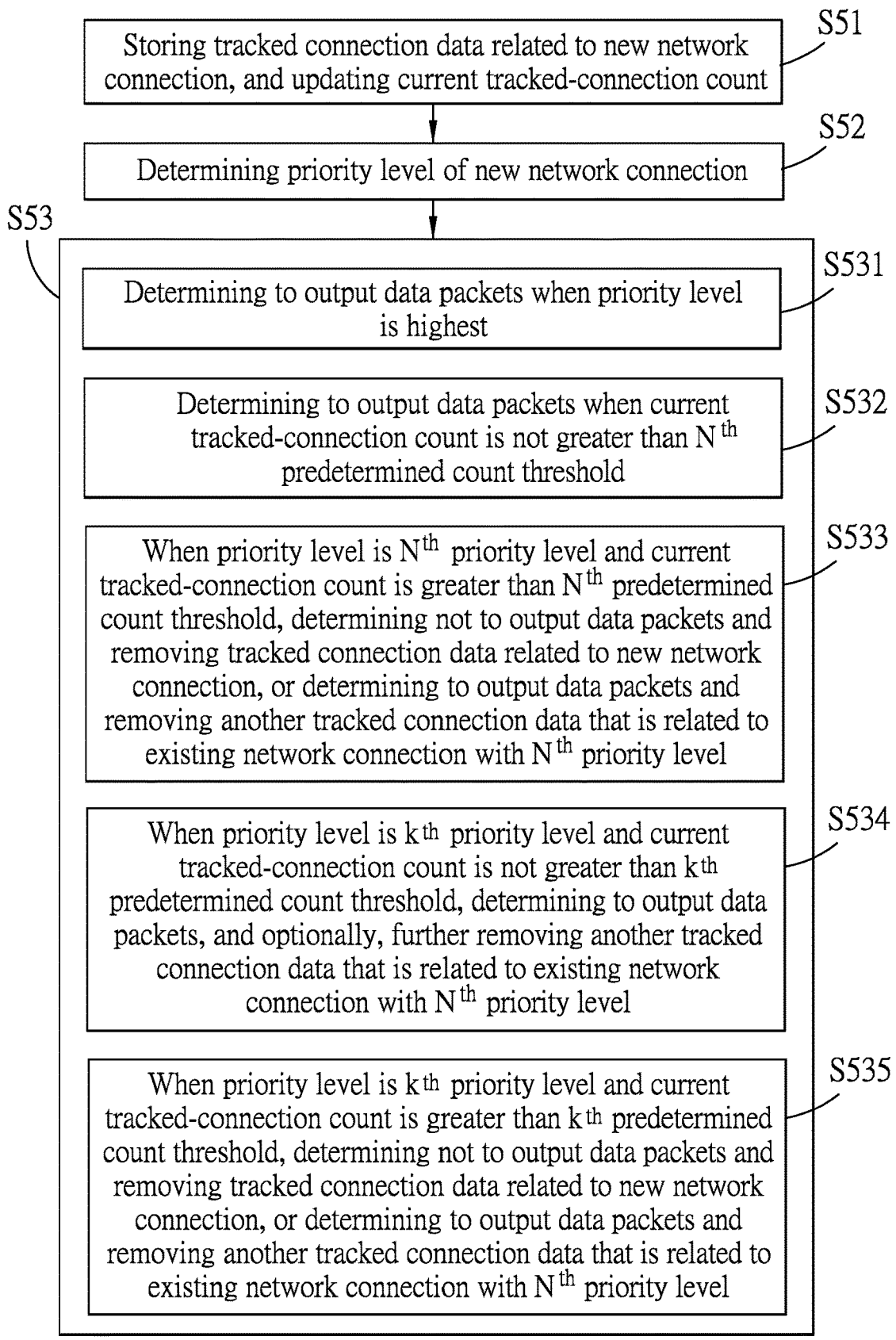
FIG. 5 is a flow chart illustrating a fourth embodiment of the method according to the disclosure.

Referring to FIG. 5, a fourth embodiment of the method is illustrated. The method includes steps S51 to S53. However, since step S51 in the fourth embodiment is similar to step S21 of the first embodiment, details of step S51 are omitted herein, and only differences between the first and fourth embodiments are explained in the following paragraphs for the sake of brevity.

In this embodiment, the priority level of the new network connection is one of a number N of priority levels, where a first one of the number N of priority levels is the highest priority level, an $N^{th}$ one of the number N of priority levels is the lowest priority level, a $j^{th}$ one of the number N of priority levels is higher than a $(j+1)^{th}$ one of the number N of priority levels, and j is an integer ranging from one to (N−1).

In step S52, the processor 11 determines which one of the number N of priority levels the priority level of the new network connection is.

In step S53, the processor 11 determines whether to output data packets that are received through the new network connection based on the current tracked-connection count, the priority level of the new network connection, and/or a number N of predetermined count thresholds. In this embodiment, the number N of predetermined count thresholds are all smaller than the table size, an $i^{th}$ one of the number N of predetermined count thresholds is greater than an $(i+1)^{th}$ one of the number N of predetermined count thresholds, and i is an integer ranging from one to (N−1). For example, the number N of predetermined count thresholds constitute a geometric progression or an arithmetic progression, where the first one of the number N of predetermined count thresholds is nighty percent of the table size and the $N^{th}$ one of the number N of predetermined count thresholds is ten percent of the table size.

More specifically, step S53 includes sub-steps S531 to S535 delineated below.

In sub-step S531, the processor 11 determines to output the data packets when it is determined that the priority level is the highest priority level (i.e., the first one of the number N of priority levels).

In sub-step S532, the processor 11 determines to output the data packets when it is determined that the current tracked-connection count is not greater than the $N^{th}$ one of the number N of predetermined count thresholds. Consequently, data packets received through the new network connection with a priority level that is lower than the highest priority level will be outputted when the current tracked-connection count is not greater than the $N^{th}$ one of the number N of predetermined count thresholds.

In sub-step S533, when it is determined that the priority level of the new network connection is the $N^{th}$ one of the number N of priority levels (i.e., the lowest priority level) and the current tracked-connection count is greater than the $N^{th}$ one of the number N of predetermined count thresholds, the processor 11 determines not to output the data packets and removes from the Conntrack table the entry of tracked connection data related to the new network connection. In an alternative embodiment, when it is determined that the priority level of the new network connection is the $N^{th}$ one of the number N of priority levels and the current tracked-connection count is greater than the $N^{th}$ one of the number N of predetermined count thresholds, the processor 11 determines to output the data packets and removes from the Conntrack table one of the entries of tracked connection data that is related to one of the existing network connections which has the $N^{th}$ one of the number N of priority levels.

When a connection condition of this embodiment is satisfied, the procedure flow proceeds to one of sub-steps S534 and S535, wherein the connection condition is that the priority level of the new network connection is one of the second one to the $(N−1)^{th}$ one of the number N of priority levels and that the current tracked-connection count is greater than the $N^{th}$ one of the number N of predetermined count thresholds.

In sub-step S534, under the connection condition of this embodiment, when it is determined that the priority level of the new network connection is a $k^{th}$ one of the number N of priority levels, and the current tracked-connection count is greater than the $N^{th}$ one of the number N of predetermined count thresholds and not greater than the $k^{th}$ one of the number N of predetermined count thresholds, the processor 11 determines to output the data packets, where k is an integer ranging from 2 to (N−1). In some implementations, in sub-step S534, the processor 11 further removes from the Conntrack table one of the entries of tracked connection data that is related to one of the existing network connections which has the $N^{th}$ one of the number N of priority levels.

In sub-step S535, under the connection condition of this embodiment, when it is determined that the priority level of the new network connection is the $k^{th}$ one of the number N of priority levels and the current tracked-connection count is greater than the $k^{th}$ one of the number N of predetermined count thresholds, the processor 11 determines not to output the data packets and removes from the Conntrack table the entry of tracked connection data related to the new network connection. Alternatively, under the connection condition of this embodiment, when it is determined that the priority level of the new network connection is the $k^{th}$ one of the number N of priority levels and the current tracked-connection count is greater than the $k^{th}$ one of the number N of predetermined count thresholds, the processor 11 determines to output the data packets, and removes from the Conntrack table one of the entries of tracked connection data that is related to one of the existing network connections which has the $N^{th}$ one of the number N of priority levels.

It should be noted that in a situation that a quantity of the priority levels is greater than a quantity of the predetermined count threshold(s), the priority levels may be grouped to form priority level set(s) in a manner that a quantity of the priority level set(s) and the number of the predetermined count threshold(s) conform to those defined in one of the first to fourth embodiments of the method that are previously described. Thereafter, determination as to whether to output data packets can be made in a similar manner as described in the corresponding one of the first to fourth embodiments of the method, based at least on the current tracked-connection count, the predetermined count threshold(s) and the priority level sets thus formed.

For example, when there are two predetermined count thresholds and four priority levels, the four priority levels can be exemplarily grouped to form three priority level sets, such that one of the three priority level sets includes two of the four priority levels (e.g., the last two), and remaining two of the three priority level sets respectively include remaining two of the four priority levels. In this way, determination as to whether to output data packets can be made in a manner similar to the third embodiment of the method, based at least on the current tracked-connection count, the two predetermined count thresholds, and the three priority level sets thus formed.

To sum up, with respect to the method for managing network connections connected through a network device according to the disclosure, determining to output or not to output data packets that are received through a new network connection is made based at least on the current tracked-connection count and the priority level of the new network connection. In this way, smooth communication through a network connection that has a relatively higher priority level may be ensured.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for managing network connections connected through a network device, the network device storing a connection-tracking (Conntrack) table where entries of tracked connection data related respectively to the network connections are stored, the method comprising steps of:
   in response to receipt of a request for establishing a new network connection, storing in the Conntrack table an entry of tracked connection data that is related to the new network connection to be established, and updating a current tracked-connection count by adding one thereto, the current tracked-connection count representing a number of entries of tracked connection data that are currently stored in the Conntrack table and that are related respectively to existing network connections connected through the network device;
   determining a priority level of the new network connection according to a data packet transmitted through the new network connection; and
   determining whether to output data packets that are received through the new network connection based at least on the current tracked-connection count and the priority level of the new network connection,
   wherein the method further comprises steps of:
   determining to output the data packets when it is determined that a connection condition is satisfied, wherein the connection condition is that the current tracked-connection count is smaller than a maximum number of data entries which can be stored in the Conntrack table and that the priority level of the new network connection is lower than a highest priority level, and
   under the connection condition, when it is determined that the current tracked-connection count is greater than a predetermined count threshold, removing from the Conntrack table one of the entries of tracked connection data that is related to one of the existing network connections which has a lowest priority level, the predetermined count threshold being smaller than the maximum number of data entries which can be stored in the Conntrack table,
   wherein the step of determining a priority level of the new network connection includes determining whether the priority level of the new network connection is the highest priority level or the lowest priority level,
   wherein the method further comprises:
   under the connection condition, when it is determined that the priority level of the new network connection is the lowest priority level and the current tracked-connection count is greater than the predetermined count threshold, determining to output the data packets and removing from the Conntrack table one of the entries of tracked connection data that is related to one of the existing network connections which has the lowest priority level.

2. The method as claimed in claim 1, further comprising: determining to output the data packets when it is determined that the current tracked-connection count is not greater than the predetermined count threshold.

3. The method as claimed in claim 1, further comprising: determining to output the data packets when it is determined that the current tracked-connection count is smaller than the maximum number of data entries which can be stored in the Conntrack table and that the priority level of the new network connection is not lower than a predetermined level.

4. The method as claimed in claim 1, wherein the step of determining a priority level of the new network connection includes determining whether the priority level of the new network connection is the highest priority level, the lowest priority level or a medium priority level that is between the highest priority level and the lowest priority level,
   wherein the method further comprises
   under the connection condition, when it is determined that the priority level of the new network connection is one of the lowest priority level and the medium priority level and the current tracked-connection count is greater than the predetermined count threshold, determining to output the data packets and removing from the Conntrack table one of the entries of tracked connection data that is related to one of the existing network connections which has the lowest priority level.

5. A method for managing network connections connected through a network device, the network device storing a connection-tracking (Conntrack) table where entries of tracked connection data related respectively to the network connections are stored, the method comprising steps of:

in response to receipt of a request for establishing a new network connection, storing in the Conntrack table an entry of tracked connection data that is related to the new network connection to be established, and updating a current tracked-connection count by adding one thereto, the current tracked-connection count representing a number of entries of tracked connection data that are currently stored in the Conntrack table and that are related respectively to existing network connections connected through the network device;

determining a priority level of the new network connection according to a data packet transmitted through the new network connection;

determining whether to output data packets that are received through the new network connection based at least on the current tracked-connection count and the priority level of the new network connection; and determining not to output the data packets and removing from the Conntrack table the entry of tracked connection data related to the new network connection when a connection condition is satisfied, wherein the connection condition is that the current tracked-connection count is smaller than a maximum number of data entries which can be stored in the Conntrack table and greater than a first predetermined count threshold which is smaller than the maximum number of data entries, and that the priority level of the new network connection is a predetermined priority level that is lower than a highest priority level, wherein the step of determining a priority level of the new network connection includes determining whether the priority level of the new network connection is the highest priority level, a lowest priority level, or a medium priority level that is between the highest priority level and the lowest priority level, wherein the predetermined priority level is the lowest priority level; and wherein the method further comprises:

under the connection condition, when it is determined that the priority level of the new network connection is the medium priority level, which is the predetermined priority level, and the current tracked-connection count is greater than a second predetermined count threshold which is smaller than the maximum number of data entries and greater than the first predetermined count threshold, determining not to output the data packets and removing from the Conntrack table the entry of tracked connection data related to the new network connection.

6. The method as claimed in claim 5, further comprising when it is determined that the current tracked-connection count is smaller than a maximum number of data entries which can be stored in the Conntrack table and greater than the first predetermined count threshold, and that the priority level of the new network connection is the medium priority level, determining to output the data packets and removing from the Conntrack table one of the entries of tracked connection data that is related to one of the existing network connections which has the lowest priority level.

7. The method as claimed in claim 5, further comprising:
when it is determined that the priority level of the new network connection is the medium priority level and the current tracked-connection count is smaller than the second predetermined count threshold, determining to output the data packets and removing from the Conntrack table one of the entries of tracked connection data that is related to one of the existing network connections which has the lowest priority level.

8. A method for managing network connections connected through a network device, the network device storing a connection-tracking (Conntrack) table where entries of tracked connection data related respectively to the network connections are stored, the method comprising steps of:

in response to receipt of a request for establishing a new network connection, storing in the Conntrack table an entry of tracked connection data that is related to the new network connection to be established, and updating a current tracked-connection count by adding one thereto, the current tracked-connection count representing a number of entries of tracked connection data that are currently stored in the Conntrack table and that are related respectively to existing network connections connected through the network device;

determining a priority level of the new network connection according to a data packet transmitted through the new network connection; and determining whether to output data packets that are received through the new network connection based at least on the current tracked-connection count and the priority level of the new network connection, wherein the step of determining a priority level of the new network connection includes determining whether the priority level of the new network connection is one of a number N of priority levels, where a first one of the number N of priority levels is a highest priority level, an $N^{th}$ one of the number N of priority levels is a lowest priority level, a $j^{th}$ one of the number N of priority levels is higher than a $(j+1)^{th}$ one of the number N of priority levels, and j is an integer ranging from one to (N−1), wherein the method further comprises
when it is determined that the priority level of the new network connection is the $N^{th}$ one of the number N of priority levels and the current tracked-connection count is greater than an $N^{th}$ one of a number N of predetermined count thresholds, determining to output the data packets and removing from the Conntrack table one of the entries of tracked connection data that is related to one of the existing network connections which has the $N^{th}$ one of the number N of priority levels, where the number N of predetermined count thresholds are all smaller than a maximum number of data entries which can be stored in the Conntrack table, an $i^{th}$ one of the number N of predetermined count thresholds is greater than an $(i+1)^{th}$ one of the number N of predetermined count thresholds, and i is an integer ranging from one to (N−1).

9. The method as claimed in claim 8, further comprising:
determining to output the data packets when a connection condition is satisfied, wherein the connection condition is that the priority level of the new network connection is one of the second one to the $(N-1)^{th}$ one of the number N of priority levels and that the current tracked-connection count is greater than the $N^{th}$ one of the number N of predetermined count thresholds.

10. The method as claimed in claim 9, further comprising:
under the connection condition, further removing from the Conntrack table one of the entries of tracked connection data that is related to one of the existing network connections which has the $N^{th}$ one of the number N of priority levels.

11. A method for managing network connections connected through a network device, the network device storing a connection-tracking (Conntrack) table where entries of tracked connection data related respectively to the network connections are stored, the method comprising steps of:
in response to receipt of a request for establishing a new network connection, storing in the Conntrack table an entry of tracked connection data that is related to the new network connection to be established, and updating a current tracked-connection count by adding one thereto, the current tracked-connection count representing a number of entries of tracked connection data that are currently stored in the Conntrack table and that are related respectively to existing network connections connected through the network device;
determining a priority level of the new network connection according to a data packet transmitted through the new network connection; and
determining whether to output data packets that are received through the new network connection based at least on the current tracked-connection count and the priority level of the new network connection,
wherein the step of determining a priority level of the new network connection includes determining whether the priority level of the new network connection is one of a number N of priority levels, where a first one of the number N of priority levels is a highest priority level, an $N^{th}$ one of the number N of priority levels is a lowest priority level, a $j^{th}$ one of the number N of priority levels is higher than a $(j+1)^{th}$ one of the number N of priority levels, and j is an integer ranging from one to (N−1),
wherein the method further comprises
when it is determined that the priority level of the new network connection is the $N^{th}$ one of the number N of priority levels and the current tracked-connection count is greater than an $N^{th}$ one of a number N of predetermined count thresholds, determining not to output the data packets and removing from the Conntrack table the entry of tracked connection data related to the new network connection, where the number N of predetermined count thresholds are all smaller than a maximum number of data entries which can be stored in the Conntrack table, an $i^{th}$ one of the number N of predetermined count thresholds is greater than an $(i+1)^{th}$ one of the number N of predetermined count thresholds, and i is an integer ranging from one to (N−1).

12. The method as claimed in claim 11, further comprising:
when it is determined that the priority level of the new network connection is a $k^{th}$ one of the number N of priority levels and the current tracked-connection count is greater than a $k^{th}$ one of the number N of predetermined count thresholds, determining not to output the data packets and removing from the Conntrack table the entry of tracked connection data related to the new network connection, where k is an integer ranging from two to (N−1).

13. The method as claimed in claim 12, further comprising:
when it is determined that the priority level of the new network connection is the $k^{th}$ one of the number N of priority levels, and the current tracked-connection count is greater than the $N^{th}$ one of the number N of predetermined count thresholds and not greater than the $k^{th}$ one of the number N of predetermined count thresholds, determining to output the data packets and removing from the Conntrack table one of the entries of tracked connection data that is related to one of the existing network connections which has the $N^{th}$ one of the number N of priority levels.

* * * * *